(12) United States Patent
Samejima et al.

(10) Patent No.: US 7,360,352 B2
(45) Date of Patent: Apr. 22, 2008

(54) SIDE DISCHARGE MOWER

(75) Inventors: Kazuo Samejima, Kaizuka (JP);
Yoshikazu Togoshi, Osaka (JP);
Masatoshi Yamaguchi, Izumi (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/365,959

(22) Filed: Mar. 1, 2006

(65) Prior Publication Data

US 2006/0230735 A1 Oct. 19, 2006

(30) Foreign Application Priority Data

Mar. 9, 2005 (JP) .............................. 2005-065765

(51) Int. Cl.
*A01D 67/00* (2006.01)
(52) U.S. Cl. ..................... 56/320.2; 56/320.1
(58) Field of Classification Search ................. 56/13.3, 56/320.2, 6, 14.7, 320.1, DIG. 20
See application file for complete search history.

(56) References Cited

U.S. PATENT DOCUMENTS

| 4,226,074 A | 10/1980 | Mullet et al. |
| 5,305,589 A | 4/1994 | Rodriguez et al. |
| 5,457,947 A * | 10/1995 | Samejima et al. ........... 56/16.7 |
| 6,038,840 A * | 3/2000 | Ishimori et al. ............. 56/13.3 |

FOREIGN PATENT DOCUMENTS

| JP | 57-82127 | 11/1980 |
| JP | H8-280225 | 10/1996 |
| JP | 2004-41060 | 2/2004 |

* cited by examiner

*Primary Examiner*—Thomas B. Will
*Assistant Examiner*—Mai T Nguyen
(74) *Attorney, Agent, or Firm*—The Webb Law Firm

(57) ABSTRACT

A side discharge mower comprises, a mower deck having a top wall, a front wall depending from the top wall, at least one side wall, a rear wall depending from the top wall, and a discharge opening formed laterally of the mower deck, a first shaft supported by the mower deck and extending vertically, and a second shaft disposed closer than the first shaft to the discharge opening, a first blade rotatable about an axis of the first shaft so that distal ends thereof define a first circular path, a second blade rotatable about an axis of the second shaft so that distal ends thereof define a second circular path, a rear baffle disposed in a rear region of the mower deck, and an intermediate baffle extending from the rear baffle forward through an area adjacent a boundary between the first circular path and the second circular path, the intermediate baffle extending from the rear baffle forwardly beyond a line connecting the first shaft and the second shaft.

16 Claims, 7 Drawing Sheets

SIDE DISCHARGE MOWER

BACKGROUND OF THE INVENTION

This invention relates to a side discharge mower having a discharge opening formed laterally of a mower deck.

A conventional example of the side discharge mower is disclosed in a Publication H8-280225 of a Japanese Patent Application. In this side discharge mower, a mower deck has a forward portion of a top surface thereof bulging upward, and the forward portion defines a grass discharge path extending to a discharge opening formed laterally of the mower deck. Further, Publication No. 2004-41060 of a Japanese Patent Application discloses a side discharge mower having a mower deck of the flat deck type having a flat top surface. The mower deck has a baffle plate formed therein and extending along front parts of rotational paths defined by distal ends of rotary blades.

With a side discharge mower, when grass clippings reach a grass discharge path, the grass clippings are released from the retaining action of the rotary blades, to be smoothly transported and discharged along the grass discharge path. Although the transport and discharge process for discharging the grass clippings from the discharge opening is performed effectively, the grass retaining action of the rotary blades decreases so that the grass clippings are not chopped up properly. It is difficult to discharge and evenly scatter grass clippings in fine pieces from the discharge opening in order to render the discharged grass clippings inconspicuous. As a result, an additional operation may be required to collect the grass clippings.

On the other hand, in the side discharge mower having a baffle plate extending along the front parts of rotational paths, the grass retaining action of the rotary blades is increased by action of the baffle plate, to chop up the grass clippings effectively. This facilitates the grass clippings being discharged and scattered evenly from the discharge opening, to render the discharged grass clippings inconspicuous. However, in a working condition requiring thick long grass to be cut, an excessive amount of grass clippings is retained by the rotary blades to have an adverse effect on grass cutting performance. In this case, not only is a proper chopping process impossible, but the height of grass becomes irregular. It is therefore difficult to make discharged grass clippings inconspicuous. In certain cases, operating accuracy may be lowered.

SUMMARY OF THE INVENTION

The object of this invention is to provide a side discharge mower that overcomes at least part of the drawbacks of the conventional side discharge mowers.

A side discharge mower according to this invention comprises:

a mower deck having a top wall, a front wall depending from the top wall, at least one side wall, a rear wall depending from the top wall, and a discharge opening formed laterally of the mower deck;

a first shaft supported by the mower deck and extending vertically, and a second shaft disposed closer than the first shaft to the discharge opening;

a first blade rotatable about an axis of the first shaft so that distal ends thereof define a first circular path;

a second blade rotatable about an axis of the second shaft so that distal ends thereof define a second circular path;

a rear baffle disposed in a rear region of the mower deck; and an intermediate baffle extending from the rear baffle forward through an area adjacent a boundary between the first circular path and the second circular path, the intermediate baffle extending from the rear baffle forwardly beyond a line connecting the first shaft and the second shaft.

The above intermediate baffle has a guiding action for effectively restraining grass clippings cut by the rotary blade located downstream in a discharge direction, from flowing into a grass retaining region of the rotary blade located upstream in the discharge direction.

DETAILED DESCRIPTION OF PREFERRED EMBODIMENTS

Next, a preferred embodiment of this invention will be described with reference to the drawings.

Figure 1:
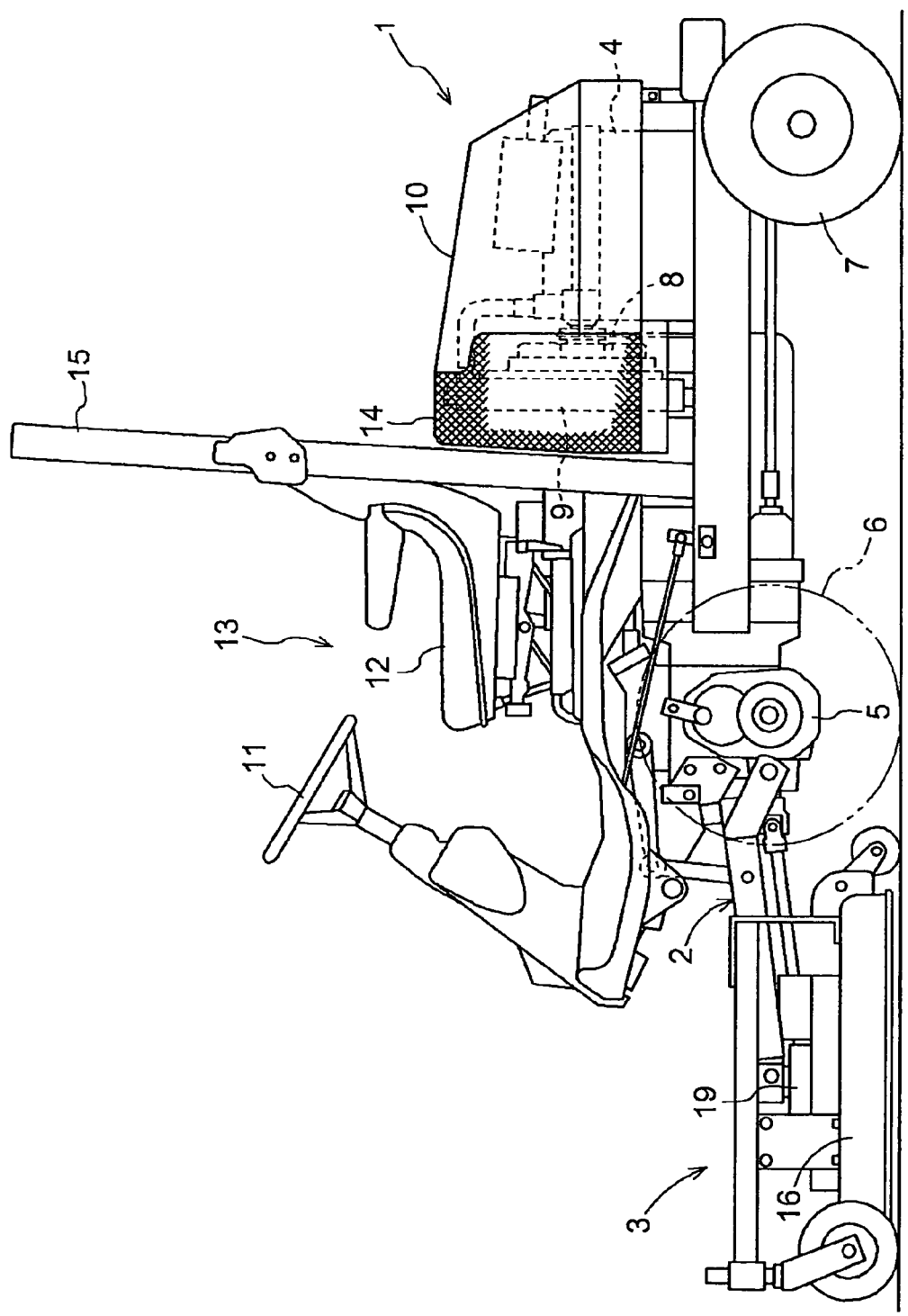
FIG. 1 is a side elevation of a side discharge mower according to this invention.
Figure 2:
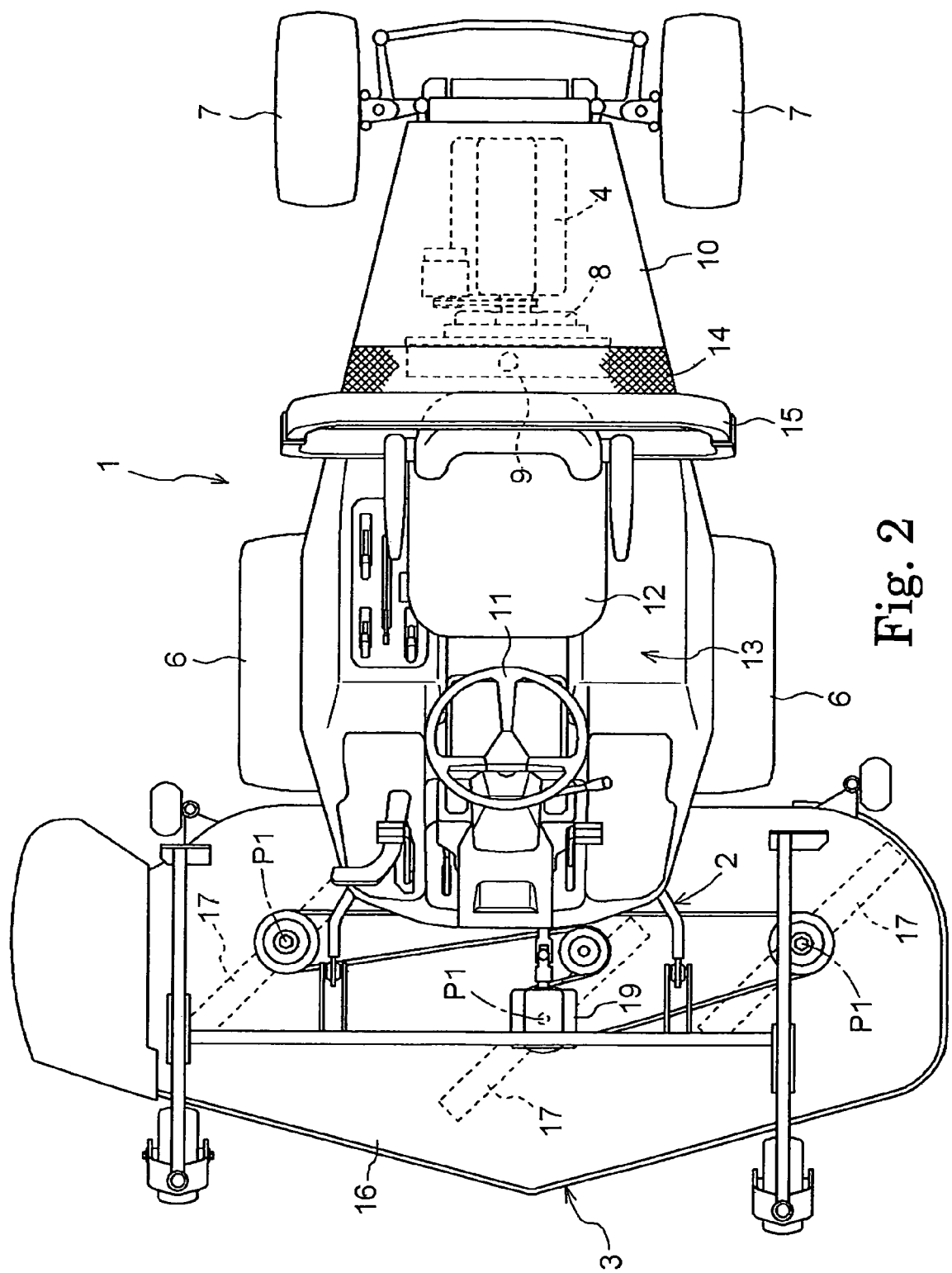
FIG. 2 is a plan view of the side discharge mower.
Figure 3:
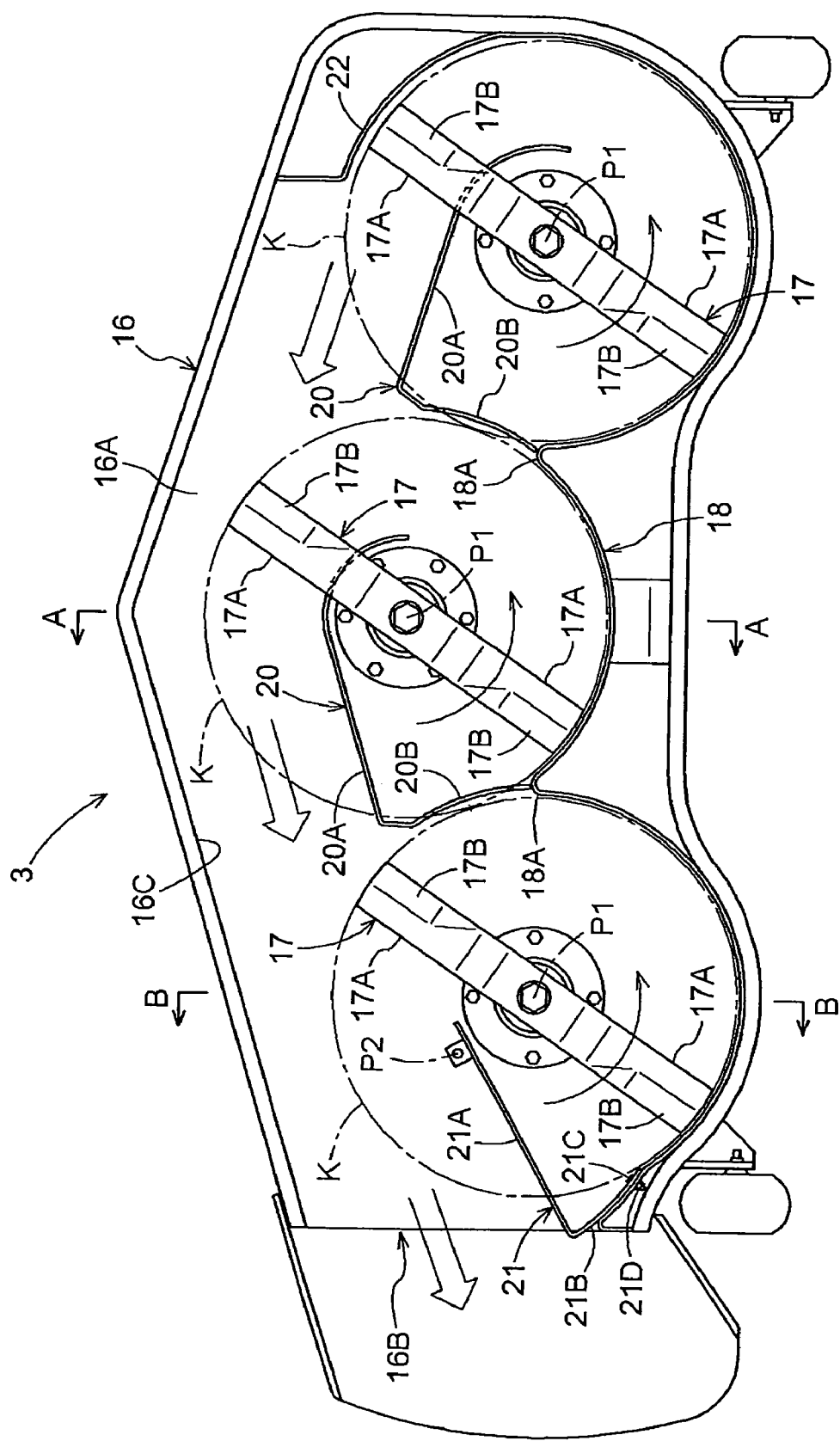
FIG. 3 is a bottom view of a mower unit.
Figure 4:
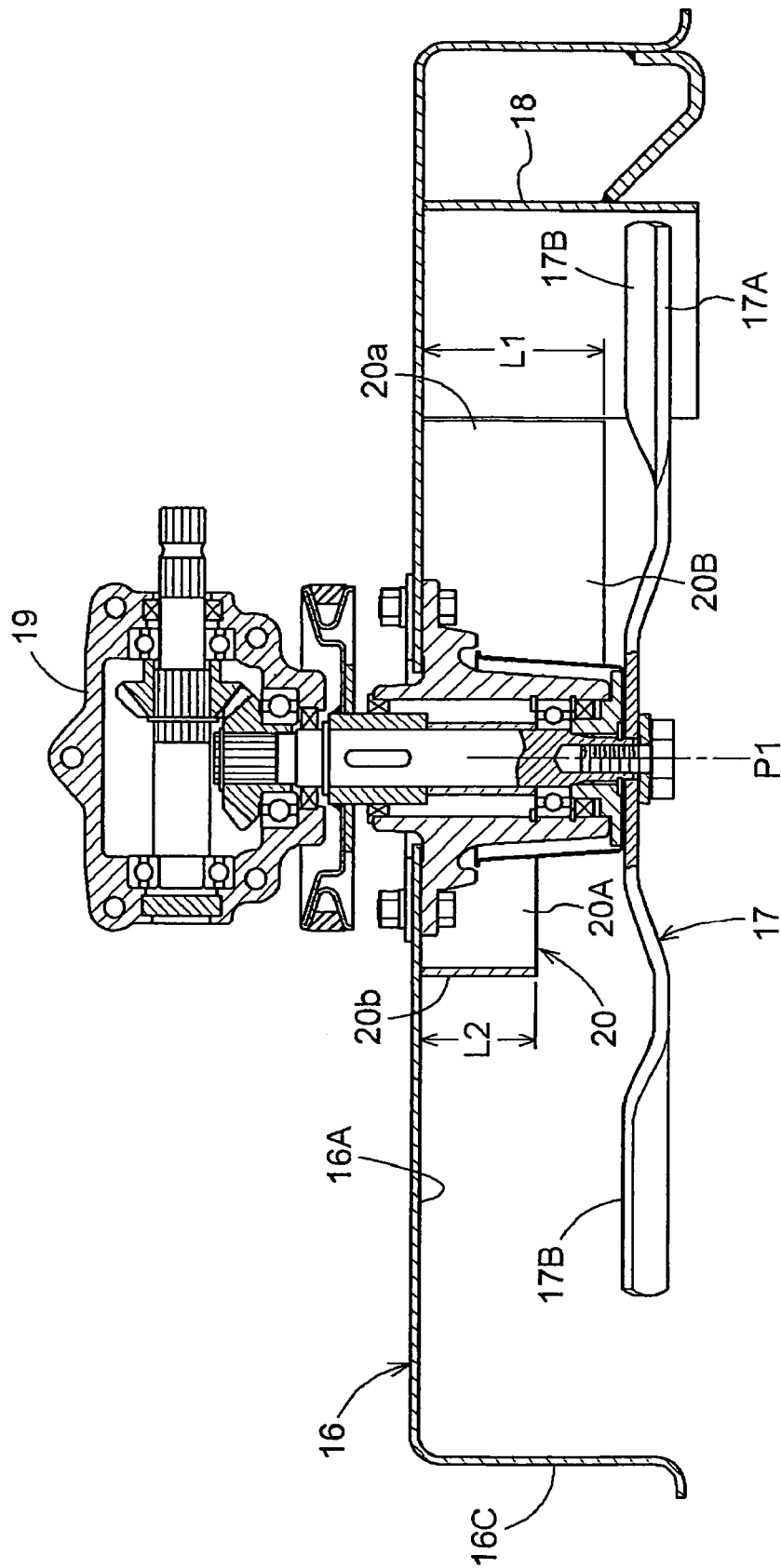
FIG. 4 is a sectional view taken on line A-A of FIG. 3.
Figure 5:
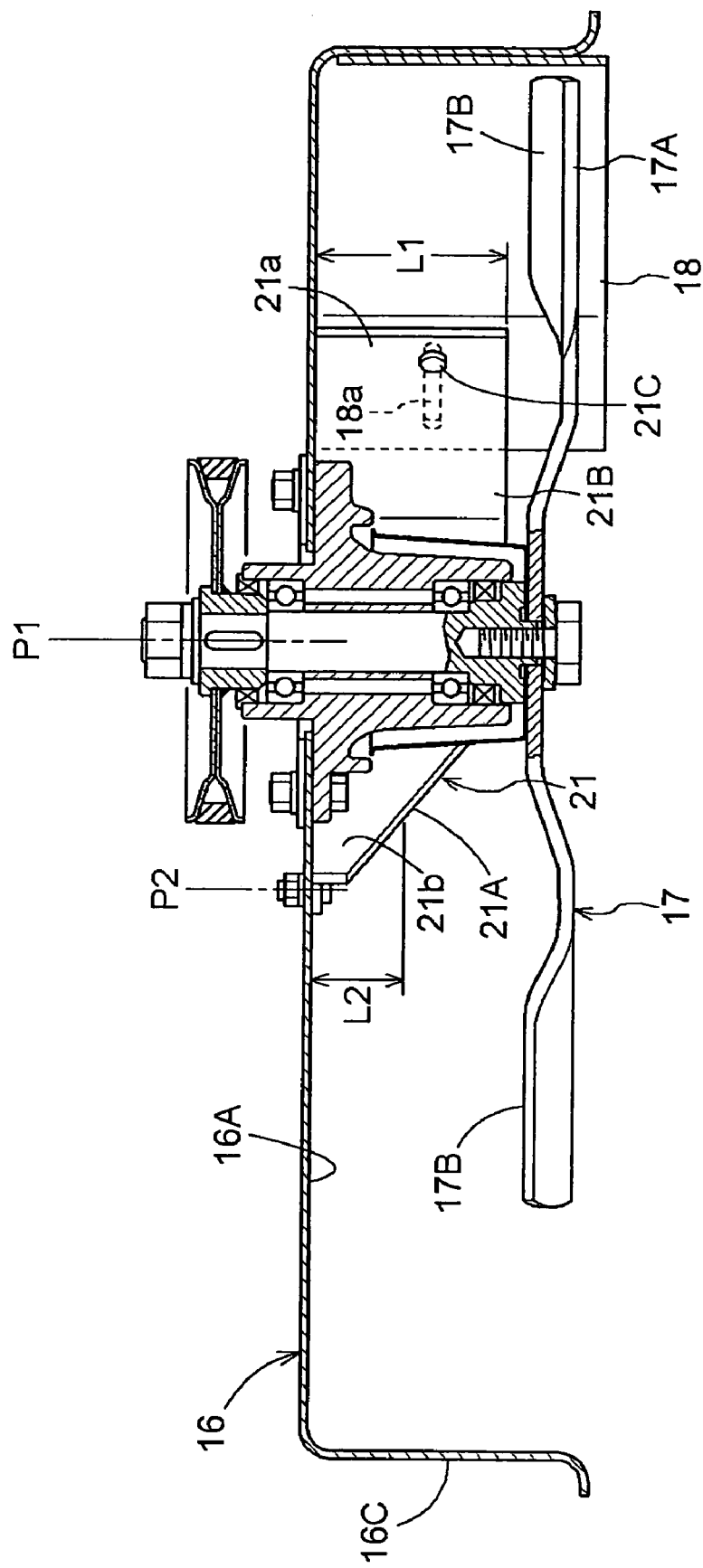
FIG. 5 is a sectional view taken on line B-B of FIG. 3.
Figure 6:
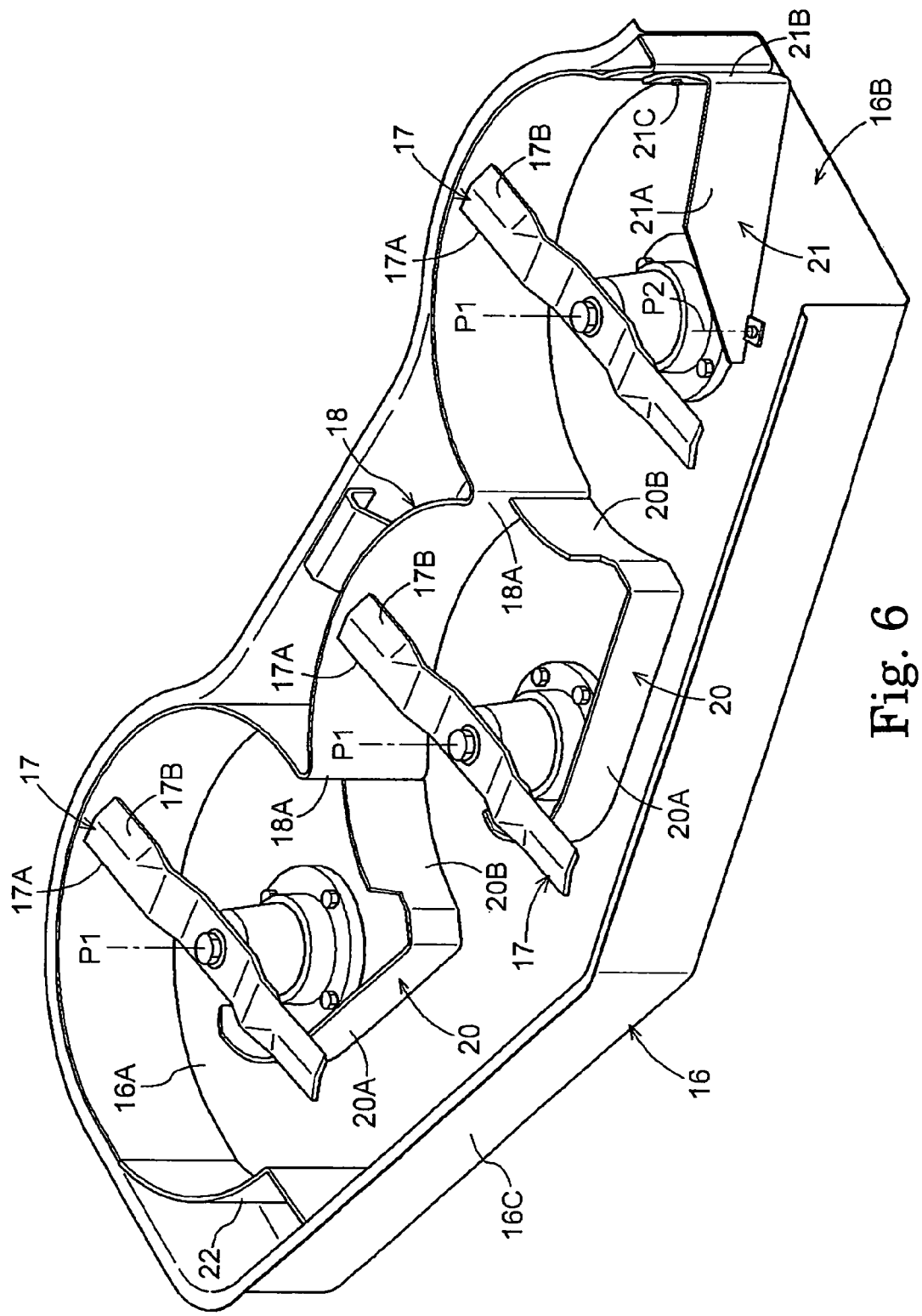
FIG. 6 is a perspective view of the mower unit seen from the bottom.

FIG. 1 shows a side elevation of a front-mount mower which is an example of working vehicles for performing a grass cutting operation. FIG. 2 shows a plan view of the front-mount mower. This front-mount mower has a mower unit 3 connected to the front of a vehicle body 1 through a link mechanism 2 vertically rockable by operation of a hydraulic cylinder (not shown).

The vehicle body 1 is the four-wheel drive type for transmitting power from a water-cooled engine 4 mounted on a rear portion of the vehicle body 1 to a change speed device 5 disposed in a front portion, and transmitting propelling drive outputted in varied speeds from the change speed device 5 to a pair of right and left front wheels 6 and a pair of right and left rear wheels 7. The vehicle body 1 has a hood 10 covering, from above, the engine 4, a cooling fan 8 disposed in front of the engine 4, and a radiator 9 erected in front of the cooling fan 8. The hood 10 is openable by vertically swinging about a rear fulcrum. The vehicle body 1 has a driving platform 13 formed forwardly of the hood 10, and including a steering wheel 11 interlocked to the rear wheels 7 for steering the latter, and a driver's seat 12. The cooling fan 8 is operable by power from the engine 4 to draw ambient air from the driving platform 13 into the hood 10 for supplying the air to the radiator 9 and the engine 4.

Numeral 14 denotes a box-like dust netting for preventing entry of grass clippings and the like to hood 10 by drawing action of the cooling fan 8. Numeral 15 denotes an arch-shaped protective frame erected behind the driver's seat 12.

As shown in FIGS. 1-6, the mower unit 3 includes a flat deck type mower deck 16 having a flat top surface 16A, and three rotary blades 17 juxtaposed sideways inside the mower deck 16 to be rotatable about vertical axes P1. The mower deck 16 houses a vacuum plate 18 (rear baffle) disposed in a rear portion thereof and extending in a wavelike form along a rotational path K defined by distal ends of each rotary blade 17. The mower unit 3 is the side discharge type having a discharge opening 16B formed at the right-hand end of the mower deck 16. Working power from the change speed device 5 is transmitted to each rotary blade 17 through a power distributor 19 disposed in an upper position of the mower deck 16, whereby each rotary blade 17 rotates about the vertical axis P1.

The three rotary blades 17 are in a V-shaped arrangement with the middle rotary blade 17 disposed more forward than the right and left rotary blades 17. Further, the rotary blades 17 are arranged such that the distal ends of adjacent blades 17 define the rotational paths K partly overlapping each other.

As shown in FIGS. 3-6, each rotary blade 17 has, in each of the opposite end regions, a cutting edge 17A formed at a forward edge which is a downstream edge in a direction of rotation, and a fanning vane 17B formed at a rearward end which is an upstream edge in the direction of rotation. With rotation of each rotary blade 17, the action of the cutting edge 17A and fanning vane 17B performs a cutting process for cutting grass, a chopping process for carrying and chopping up grass clippings, and a transport and discharge process for transporting chopped grass clippings toward the discharge opening 16B and discharging and scattering the grass clippings from the discharge opening 16B.

As shown in FIGS. 3-7, the mower deck 16 houses stationary baffle plates 20 (first baffle members) arranged between the top surface 16A and left rotary blade 17, and between the top surface 16A and middle rotary blade 17. Each baffle plate 20 has a first guide portion 20A and a second guide portion 20A. The first guide portion 20A extends from near the vertical axis P1 of the rotary blade 17 located upstream in a grass discharge direction, toward a position forwardly of the vertical axis P1 of the rotary blade 17 located next downstream in the discharge direction. The second guide portion 20B (intermediate baffle) extends from a forwardly bulging portion 18A of the vacuum plate 18, forward through an area between two adjacent vertical axes. That is, the second guide portion 20B has a front end thereof located forwardly of an imaginary straight line connecting the two vertical axes, and at this point connects to the first guide portion 20A. Also, the second guide portion 20B (intermediate baffle) extends from the vacuum plate 18 (rear baffle) forward through an area adjacent a boundary between the two circular paths of the two neighboring blades (the center blade and the left blade). The "area adjacent a boundary between the circular paths" refers to a general area where the first and second circular paths come closest to each other. This general area includes points that are within a circle centered at a point where the first and second circular paths come closest to each other with ⅓ of the radius of the first blade. Between the top surface 16A and right rotary blade 17 is a movable baffle plate 21 having a guide portion 21A and a contact portion 21B. The guide portion 21A extends from near the vertical axis P1 of the rotary blade 17 located most downstream in the discharge direction, toward the discharge opening 16B. The contact portion 21B extends into contact with the vacuum plate 18. The movable baffle plate 21 is swingable fore and aft about a fulcrum P2 set to a position adjacent the vertical axis P1, to adjust the size of the discharge opening 16B.

Each of the stationary baffle plates 20 and movable baffle plate 21 is formed such that a vertical length L1 from the top surface 16A of the mower deck 16 to a rearward position 20a or 21a adjacent the vacuum plate 18 is greater than a vertical length L2 from the top surface 16A of the mower deck 16 to a forward position 20b or 21b adjacent the vertical axis P1.

Figure 7:
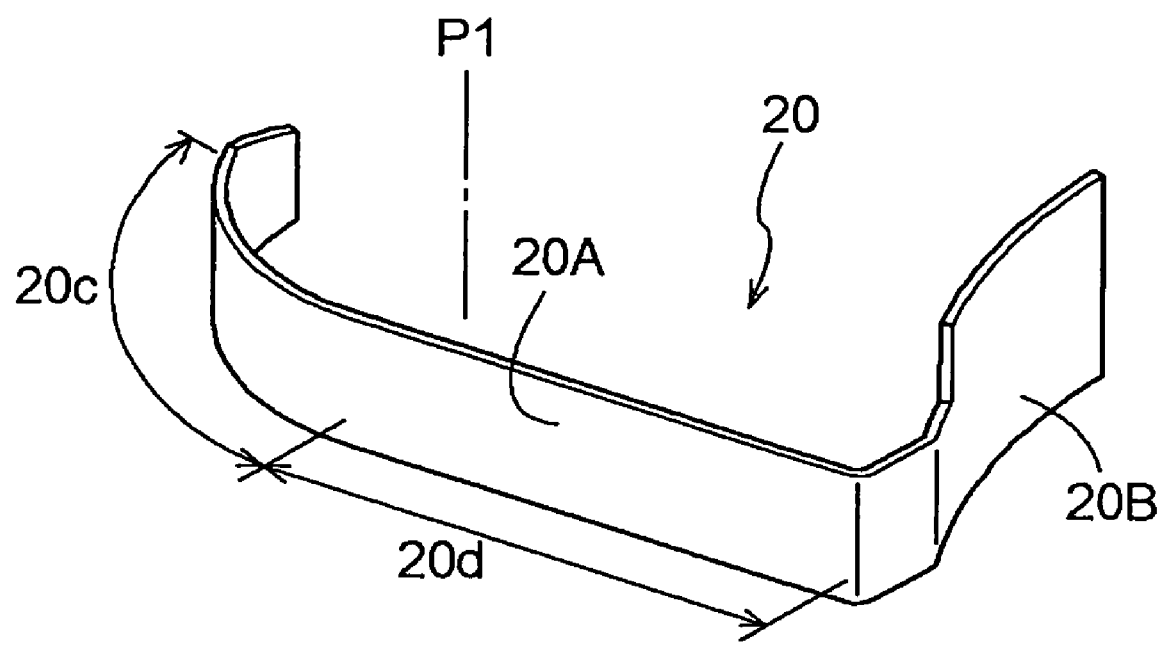
FIG. 7 is a perspective view showing a shape of a stationary baffle plate.

As shown in FIG. 7, the first guide portion 20A of each stationary baffle plate 20 has a straight downstream guide section 20d extending along a front wall 16C of the mower deck 16. One end of the downstream guide section 20d is connected to an upstream guide section 20c curved adjacent the vertical axis P1 to extend substantially along the rotational path K of the rotary blade 17 (that is, substantially forming an arc around the axis P1).

The second guide portion 20B is curved along the rotational path K of the rotary blade 17 located next downstream in the discharge direction.

The movable baffle plate 21 has a bolt 21C fixed to the contact portion 21B and inserted through a fore and aft slot 18a formed in a junction part with the baffle plate 21 of the vacuum plate 18. A nut 21D is meshed with this bolt 21C, whereby the movable baffle plate 21 is fixed to a selected swing position.

The mower deck 16 further includes a guide plate 22 disposed in a left front corner and extending from the left end toward the front end along the rotational path K defined by the distal ends of the left rotary blade 17 located the most upstream in the discharge direction.

Compare with the case of forming a grass discharge path as bulging from the front of a mower deck, the above construction employing the flat deck type mower deck 16 significantly checks transport and discharge of grass clippings caused by rotation of the rotary blades 17, and significantly promotes the grass retaining action of the rotary blades 17. The grass clippings, while being subjected to the retaining action of the rotary blades 17, are subjected also to the guiding action of the stationary baffle plates 20 and movable baffle plate 21. Consequently, long grass clippings, which cannot be raised easily, are for the most part chopped up while receiving the retaining action of the rotary blades 17, without receiving the guiding action of the first guide portions 20A of the baffle plates 20 and the baffle plate 21. Short grass clippings, which are easily raised, are for the most part transported toward the discharge opening 16B by the guiding action of the first guide portions 20A of the baffle plates 20 and the baffle plate 21 while receiving the retaining action of the rotary blades 17.

Grass clippings chopped up by the left-hand rotary blade 17 located the most upstream in the discharge direction receive the guiding action of the first guide portion 20A of the baffle plate 20 and the baffle plate 20 located at the left-hand side, to be guided promptly to a guiding region of the first guiding portion 20A of the middle baffle plate 20 located downstream in the discharge direction. Grass clippings chopped up by the middle rotary blade 17 receive the guiding action of the second guide portion 20B of the baffle plate 20 located at left-hand side, to be effectively restrained from flowing into a retaining region of the left rotary blade 17, and promptly guided into a guiding region of the first guide portion 20A of the middle baffle plate 20 in a state of having directivity pointing to the discharge opening 16B. These grass clippings join the grass clippings from the upstream region in the discharge direction, and receive the guiding action of the first guiding portion 20A of the middle baffle plate 20, to be guided promptly into a guiding region of the baffle plate 21 located downstream in the discharge direction. Grass clippings chopped up by the right rotary blade 17 located the most downstream in the discharge direction receive the guiding action of the second guide portion 20B of the middle baffle plate 20 to be effectively restrained from flowing into a retaining region of the middle rotary blade 17, and promptly guided into a guiding region of the baffle plate 21 in a state of having directivity pointing to the discharge opening 16B. These grass clippings join the grass clippings from the upstream regions in the discharge direction, and receive the guiding action of the baffle plate 21, to be guided promptly toward the discharge opening 16B.

When the movable baffle plate 21 is moved to enlarge the discharge opening 16B, the discharge of the grass clippings from the discharge opening 16B is promoted, thereby decreasing the amount of grass clippings retained by each rotary blade 17. Conversely, when the discharge opening 16B is reduced in size, the grass clippings are discharged in a reduced amount from the discharge opening 16B, thereby increasing the amount of grass clippings retained by the right rotary blade 17 to promote the chopping performance. For example, cutting wet and heavy grass, the movable baffle plate 21 may be moved to enlarge the discharge opening 16B. Then, even heavy grass clippings, which cannot be raised easily, can be discharged promptly from the discharge opening 16B, to decrease the amount of grass clippings retained by each rotary blade 17. Conversely, when cutting dry and light grass, the discharge opening 16B may be reduced in size by operating the movable baffle plate 21. Then, even light grass clippings, which are easy to raise, can be discharged in a reduced amount from the discharge opening 16B, to be retained and chopped up effectively by each rotary blade 17.

The first guide portion 20A of each baffle plate 20 extends from near the vertical axis P1 of the rotary blade 17 located upstream in the discharge direction, toward a position forwardly of the vertical axis P1 of the rotary blade 17 located next downstream in the discharge direction. The baffle plate 21 extends from near the vertical axis P1 of the rotary blade 17 located most downstream in the discharge direction, toward the discharge opening 16B. With this arrangement, in a region ("follow-cut region") of each rotary blade 17 where the blade starts to rotate towards rear after the blade rotates past the most forward position, the first guide portions 20A and the baffle plate 21 can hold grass that evades the rotary blade 17 as the vehicle body moves forward. Thus, such grass may be cut effectively by the rotary blades 17.

That is, while each rotary blade 17 can cut grass effectively also in the follow-cut region, each rotary blade 17 can chop up long grass clippings properly, and can transport and discharge short grass clippings promptly. Even in a working condition requiring thick long grass to be cut, it is possible to avoid a possibility of an excessive amount of grass clippings being retained by the rotary blades 17 to have an adverse effect on grass cutting performance or to lower power. The grass clippings may be discharged and scattered evenly from the discharge opening 16B, to render the discharged grass clippings inconspicuous. As a result, the grass cutting performance is improved, and the grass chopping process and the grass transporting and discharging process may be carried out effectively and in a balanced way.

OTHER EMBODIMENTS

Other embodiments of this invention are set out below.

[1] The working vehicle may be a mid-mount mower having the mower unit 3 attached to the vehicle body 1 between the front wheels 6 and rear wheels 7, or a compound working vehicle having a mower unit 3 along with a front loader and a backhoe.

[2] The mower unit 3 may have two rotary blades 17, or four or more rotary blades 17, arranged sideways to be driven to rotate about vertical axes P1 inside the flat deck type mower deck 16 having the flat top surface 16A.

[3] The movable baffle plate 21 may be constructed fixable by friction in a selected fore and aft swing position, and/or interlocked to a control device provided on the driving platform 13 so that the baffle plate 21 is swingable fore and aft by manipulation from the driving platform 13.

[4] Each of the baffle plates 20 and 21, in a position adjacent the vacuum plate 18 and in a position adjacent the vertical axis P1, may have the same vertical distance from the top surface 16A of the mower deck 16.

What is claimed is:

1. A side discharge mower comprising:
   a mower deck having a top wall, a front wall depending from said top wall, at least one side wall, a rear wall depending from said top wall, and a discharge opening formed laterally of said mower deck;
   a first shaft supported by said mower deck and extending vertically, and a second shaft disposed closer to said discharge opening than said first shaft;
   a first blade rotatable about an axis of said first shaft so distal ends thereof define a first circular path;
   a second blade rotatable about an axis of said second shaft so that distal ends thereof define a second circular path;
   a rear baffle disposed in a rear region of said mower deck;
   an intermediate baffle extending from said rear baffle forward through an area adjacent a boundary between the first circular path and the second circular path, said intermediate baffle extending from said rear baffle forwardly beyond a line connecting said first shaft and said second shaft; and
   a second baffle member substantially continuous with said rear baffle, said second baffle member having a first guide portion, extending from a point located inside said second circular path toward said discharge opening to a first end that is laterally closer to the discharge opening than the second shaft, for guiding grass clippings generally toward said discharge opening, and a second portion substantially continuous with the first end adjacent said discharge opening of said first guide portion at a position laterally between the second shaft and the discharge opening, the second portion being also substantially continuous with said rear baffle;
   wherein a rear surface of the front wall and a front surface of the first guide portion of the second baffle member are positioned to form a conduit that allows substantially free passage of grass clippings cut by the first and second blades toward the discharge opening; and
   wherein the first guide portion of the second baffle member having a free end that is positioned within the second circular path, such that an opening is formed between the free end of the first guide portion of the second baffle member and the intermediate baffle to allow passage of grass clippings cut by the second blade to the conduit.

2. A side discharge mower as defined in claim 1, wherein said intermediate baffle has a portion shaped to extend substantially along said second circular path.

3. A side discharge mower as defined in claim 1, wherein said intermediate baffle is a part of a first baffle member, said first baffle member further including:
   a first guide portion extending from a forward position adjacent the first shaft to a position adjacent said second circular path of said second blade for guiding grass clippings into a forward region of the second circular path, wherein an end of said first guide portion of the first baffle member located adjacent said second circular path is substantially connected to an end of said intermediate baffle.

4. A side discharge mower as defined in claim 3, wherein said first guide portion of the first baffle member has a substantially straight portion.

5. A side discharge mower as defined in claim 4, further comprising an arcuate portion extending substantially around said first shaft, and continuous with said first guide portion of the first baffle member, and with said substantially straight portion.

6. A side discharge mower as defined in claim 4, wherein a tangent line of said straight portion of the first baffle member extends toward a position between a front end of said second circular path and said second shaft.

7. A side discharge mower as defined in claim 4, wherein an end of said substantially straight portion of the first baffle member is located forwardly of said first shaft.

8. A side discharge mower as defined in claim 3, wherein the first guide portion of the first baffle member has a vertical dimension smaller than a vertical dimension of at least part of the intermediate baffle, and the intermediate baffle has a vertical dimension smaller than a vertical dimension of the rear baffle.

9. A side discharge mower as defined in claim 2, further comprising attachment means for displaceably attaching the second portion of said second baffle member to said rear baffle, the attachment means including a portion of the second baffle member that is shaped to conform to a surface of the rear baffle and a fastener that allows movement of the second baffle member with respect to the surface of the rear baffle in a direction along the surface of the rear baffle to adjust an extent of opening of said discharge opening.

10. A side discharge mower as defined in claim 1, wherein said rear baffle has an overall shape extending along rear portions of the paths of said first blade and said second blade.

11. A side discharge mower as defined in claim 1, further comprising:
a third shaft supported by said mower deck, and disposed farther away from said discharge opening than said first shaft;
a third blade rotatable about an axis of said third shaft so that distal ends thereof define a third circular path; and
a third baffle member substantially continuous with said rear baffle, said third baffle member having an intermediate baffle extending from said rear baffle forward through an area adjacent a boundary between the first circular path and the third circular path, said intermediate baffle extending from said rear baffle forwardly beyond a line connecting said first shaft and said third shaft.

12. A side discharge mower as defined in claim 11, further comprising a baffle extending along the third circular path in a forward region of said mower deck.

13. A side discharge mower as defined in claim 1, wherein the front wall extends along a front edge of the top wall and depends from the front edge.

14. A side discharge mower as defined in claim 1, wherein the free end of the first guide portion of the second baffle member is closer to the second shaft than any point in the second circular path.

15. A side discharge mower comprising:
a mower deck having a top wall, a front wall depending from said top wall, at least one side wall, a rear wall depending from said top wall, and a discharge opening formed laterally of said mower deck;
a first shaft supported by said mower deck and extending vertically, and a second shaft disposed closer to said discharge opening than said first shaft;
a first blade rotatable about an axis of said first shaft so that distal ends thereof define a first circular path;
a second blade rotatable about an axis of said second shaft so that distal ends thereof define a second circular path;
a rear baffle disposed in a rear region of said mower deck;
an intermediate baffle extending from said rear baffle forward through an area adjacent a boundary between the first circular path and the second circular path, said intermediate baffle extending from said rear baffle forwardly beyond a line connecting said first shaft and said second shaft, wherein said intermediate baffle has a portion shaped to follow said second circular path; and
a second baffle member substantially continuous with said rear baffle, said second baffle member having a first guide portion, extending from a point located inside said second circular path toward said discharge opening to a first end that is laterally closer to the discharge opening than the second shaft, for guiding grass clippings generally toward said discharge opening, and a second portion substantially continuous with the first end adjacent said discharge opening of said first guide portion at a position laterally between the second shaft and the discharge opening, the second portion being also substantially continuous with said rear baffle;
wherein a rear surface of the front wall and a front surface of the first guide portion of the second baffle member are positioned to form a conduit that allows substantially free passage of grass clippings cut by the first and second blades toward the discharge opening; and
wherein the first guide portion of the second baffle member having a free end that is positioned within the second circular path, such that an opening is formed between the free end of the first guide portion of the second baffle member and the intermediate baffle to allow passage of grass clippings cut by the second blade to the conduit.

16. A side discharge mower comprising:
a mower deck having a top wall, a front wall depending from said top wall, at least one side wall, a rear wall depending from said top wall, and a discharge opening formed laterally of said mower deck;
a first shaft supported by said mower deck and extending vertically, and a second shaft disposed closer to said discharge opening than said first shaft;
a first blade rotatable about an axis of said first shaft so that distal ends thereof define a first circular path;
a second blade rotatable about an axis of said second shaft so that distal ends thereof define a second circular path;
a rear baffle disposed in a rear region of said mower deck;
a first baffle member substantially continuous with said rear baffle, said first baffle member including:
a first guide portion extending from a forward position adjacent the first shaft to a position adjacent said second circular path of said second blade for guiding grass clippings into a forward region of the second circular path; and
an intermediate baffle extending from said rear baffle forward through an area adjacent a boundary between the first circular path and the second circular path, said intermediate baffle extending from said rear baffle forwardly beyond a line connecting said first shaft and said second shaft, wherein an end of said first guide portion located adjacent said second circular path is substantially connected to an end of said intermediate baffle; and
a second baffle member substantially continuous with said rear baffle, said second baffle member having a first guide portion, extending from a point located inside said second circular path toward said discharge opening to a first end that is laterally closer to the discharge opening than the second shaft, for guiding grass clippings generally toward said discharge opening, and a second portion substantially continuous with the first end adjacent said discharge opening of said first guide portion at a position laterally between the second shaft and the discharge opening, the second portion being also substantially continuous with said rear baffle;

wherein a rear surface of the front wall and a front surface of the first guide portion of the second baffle member are positioned to form a conduit that allows substantially free passage of grass clippings cut by the first and second blades toward the discharge opening; and wherein the first guide portion of the second baffle member having a free end that is positioned within the second circular path, such that an opening is formed between the free end of the first guide portion of the second baffle member and the intermediate baffle to allow passage of grass clippings cut by the second blade to the conduit.

* * * * *